(12) United States Patent
Avakian et al.

(10) Patent No.: US 8,829,064 B2
(45) Date of Patent: Sep. 9, 2014

(54) DIFFUSED LIGHT TRANSMITTER

(75) Inventors: Roger W. Avakian, Aurora, OH (US); John Papadopulos, Canton, OH (US)

(73) Assignee: PolyOne Corporation, Avon Lake, OH (US)

( * ) Notice: Subject to any disclaimer, the term of this patent is extended or adjusted under 35 U.S.C. 154(b) by 1313 days.

(21) Appl. No.: 12/096,054

(22) PCT Filed: Dec. 21, 2006

(86) PCT No.: PCT/US2006/062464
§ 371 (c)(1),
(2), (4) Date: Jun. 4, 2008

(87) PCT Pub. No.: WO2007/076430
PCT Pub. Date: Jul. 5, 2007

(65) Prior Publication Data
US 2008/0262117 A1  Oct. 23, 2008

Related U.S. Application Data

(60) Provisional application No. 60/754,774, filed on Dec. 29, 2005, provisional application No. 60/771,799, filed on Feb. 9, 2006.

(51) Int. Cl.
*C08K 3/22* (2006.01)
*C08K 3/36* (2006.01)
*C08K 5/54* (2006.01)
*G08B 5/02* (2006.01)
*B82Y 30/00* (2011.01)

(52) U.S. Cl.
CPC . *C08K 3/36* (2013.01); *B82Y 30/00* (2013.01); *C08K 2201/011* (2013.01)
USPC ............. 521/91; 359/599; 523/122; 523/169; 524/261; 524/401; 524/493

(58) Field of Classification Search
CPC .......... B22F 9/16; B22F 1/0022; B82Y 30/00; B82Y 10/00; G02F 1/13439; H05K 1/097; H05K 2201/0108; C09D 175/16; H01L 31/1884
USPC ............. 521/91; 523/122, 169; 524/493, 492, 524/261, 401; 359/599
See application file for complete search history.

(56) References Cited

U.S. PATENT DOCUMENTS

| | | | | |
|---|---|---|---|---|
| 4,906,676 A | * | 3/1990 | Ida ................................. | 523/212 |
| 5,066,420 A | * | 11/1991 | Chevallier ...................... | 516/82 |
| 5,276,757 A | | 1/1994 | Levy et al. | |
| 5,307,438 A | * | 4/1994 | Bilkadi et al. ................. | 385/141 |
| 5,910,522 A | * | 6/1999 | Schmidt et al. ............... | 523/168 |
| 6,765,071 B1 | | 7/2004 | Fujishiro et al. | |
| 6,787,202 B2 | | 9/2004 | Mizutani et al. | |
| 6,801,696 B2 | | 10/2004 | Davis et al. | |
| 6,874,922 B2 | | 4/2005 | Matsuura et al. | |
| 2003/0128549 A1 | * | 7/2003 | Matsuura et al. ............. | 362/497 |
| 2005/0141843 A1 | | 6/2005 | Warden et al. | |

FOREIGN PATENT DOCUMENTS

KR  1020050099289 A  10/2005

OTHER PUBLICATIONS

Written Opinion of the International Searching Authority for PCT/US2006/062464. Mailed Sep. 11, 2007.*

* cited by examiner

*Primary Examiner* — Ling Choi
*Assistant Examiner* — Chun-Cheng Wang
(74) *Attorney, Agent, or Firm* — John H. Hornickel

(57) ABSTRACT

A compound of substantially transparent resin and amorphous silica particulate is disclosed. The silica particulate are nanometric size and dispersed throughout in the resin. The compound can be used to make an article to diffuse and transmit light from a point source of light.

14 Claims, No Drawings

DIFFUSED LIGHT TRANSMITTER

CLAIMS OF PRIORITY

This application claims priority from (a) U.S. Provisional Patent Application Ser. No. 60/754,774 and filed on Dec. 29, 2005 and (b) U.S. Provisional Patent Application Ser. No. 60/771,799 and filed on Feb. 9, 2006, both of which are incorporated by reference.

FIELD OF THE INVENTION

This invention concerns a diffused light transmitter.

BACKGROUND OF THE INVENTION

Sources of artificial light have progressed from Edison's invention of the light bulb to recent advancements in the use of light emitting diodes (LEDs) in an array.

In most circumstances, points of bright light are desired, such as taillights for motor vehicles or traffic lights. In other circumstances, there is a desire to generate a diffused light. For example, use of "flight pipes" from a source of light to provide a diffused light is marketed at www.luxaura.com.

SUMMARY OF THE INVENTION

It is a problem to generate a consistent diffusion of light emanating from a point source.

What the art needs is a means to uniformly distribute light from a surface other than the source of the light, without unduly sacrificing either the transparency of that surface or the intensity of the total light emanating from the surface.

The present invention solves that problem by using substantially transparent resin, such as extrusion grade acrylic resin, and opaque particulate that are compatible with the substantially transparent resin.

One aspect of the present invention is a compound comprising a substantially transparent resin and amorphous silica particulate having a nanometric size dispersed in the resin.

Advantages of the present invention will become apparent during the description of the embodiments.

EMBODIMENTS OF THE INVENTION

Substantially Transparent Resin

For purposes of this invention, a "substantially transparent resin" is a polymer or blend or alloy of polymer that has a high degree of translucency, approaching ideal transparency. These resins are often used as a replacement for glass, especially for specialized lighting displays.

Non-limiting examples of substantially transparent resins include extrusion grade acrylic resin) polycarbonate resin, and the like. Preferably, the resins to be used are within the grades identified as "optical grade."

Commercial sources of extrusion grade acrylic resin include Plexiglas brand acrylic resin from Altuglas Inteinational of Arkema, Inc. distributed by PolyOne Distribution (www.polyonedistribution.com). Commercial sources of optical grade polycarbonate include Makrolon brand polycarbonate resin from BayerMaterialScience and also distributed by PolyOne Distribution.

Silica Particulate

Silica particulate useful for the present invention is amorphous silica (CAS #7631-86-9) that is nanometric is size. The particle size can range from about 20-nm to about 550 nm, and preferably has a mean particle size of about 250 nm. The silica particulate can have a B.E.T. surface area of about 20-30 $m^2/g$.

Preferably, the silica particulate are treated to modify the surface properties of the silica particulate. More preferably, the surface modification employs a silane composition. Most preferably, the silane composition is an aliphatic silane, such as an alkoxysilane. The silane can have from about 8 to about 18 carbon atoms. Representative examples of silane compositions are n-octyltrimethoxysilane and quaternary ammonium functional alkoxysilane commercially available from Dow Corning.

The silane treatment provides hydrophobation to the silica particulate, improving the compatibility of the treated silica particulate with the substantially transparent resin. The alteration of the silica from hydrophilic to hydrophobic in character permits the individual silica particles to more evenly disperse within the substantially transparent resin.

Treated and untreated amorphous silica particulate of a nanometric size are commercially available from Energy Strategy Associates, Inc. of Old Chatham, N.Y. 12136 USA.

The amount of silica particulate to be dispersed in the substantially transparent resin depends on whether the commercial product is to be a concentrate or a fully diluted compound. If the product is to be a fully diluted compound, the amount of silica particulate in the substantially transparent resin ranges from about 2 to about 25 weight percent, and preferably from about 10 to about 20 weight percent. If the product is to be a concentrate, the amount of silica particulate in the substantially transparent resin ranges from about 40 to about 80 weight percent, and preferably from about 60 to about 70 weight percent.

Optional Additives

The compound of the present invention can include conventional plastics additives in an amount that is sufficient to obtain a desired processing or performance property for the compound. The amount should not bc wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Processing

The preparation of compounds of the present invention is uncomplicated. The compound of the present can be made in batch or continuous operations.

Mixing in a continuous process typically occurs in an extruder that is elevated to a temperature that is sufficient to melt the polymer matrix with addition of the solid ingredient additives either at the head of the extruder or downstream in the extruder. Extruder speeds can range from about 50 to about 500 revolutions per minute (rpm), and preferably from about 100 to about 300 rpm. Typically, the output from the extruder can be pelletized for later extrusion or molding into polymeric articles or can be directly extruded into shaped profiles.

Mixing in a batch process typically occurs in a Banbury mixer that is also elevated to a temperature that is sufficient to melt the polymer matrix to permit addition of the solid ingredients. The mixing speeds range from 60 to 1000 rpm and temperature of mixing can be ambient. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

Usefulness Of The Invention

The compatibility of the substantially transparent resin with the silica particulate provides an ultra fine dispersion of the nano-sized particles, yielding a polymer compound having the substantial transparency, intensity of diffused light, and light distribution uniformity that is desired for specialized lighting articles.

For example, a compound having 15 weight percent treated silica particulate dispersed in the acrylic resin and formed into a cylindrical shape results in a light pipe that diffuses light from the circumference substantially evenly along the length of the cylinder from a point source of light contacting one or both ends of the cylinder.

The example frillier explains the invention.

EXAMPLE

A sample was prepared composed of 15 weight percent treated silica particulate (treated with Dow Corning's Z-6346 brand quaternary ammonium functional alkoxysilane) from Energy Strategy Associates, Inc. and 85 weight percent extrusion grade Plexiglas vs 100 resin from Arkema, Inc.

The example was prepared using a 16 mm Prism co-rotating twin screw extruder made by Thermo Electron Corporation of Stone, U.K. Both ingredients were added at the throat. The feeder rate was 13%. The extruder rotated at 5001-pin. The temperatures were set at 220° C. for Zones 1 and 2, 230° C. for Zones 3-5, 240° C. for Zones 6-9, and 245° C. for the die.

The example was extruded to form a cylinder shaped article, A variety of thermoplastic physical tests were performed. Table 1 shows the results.

TABLE 1

Physical Properties

| Test | ASTM No. | Value | Units |
| --- | --- | --- | --- |
| Specific Gravity | D792 | 1.26 | — |
| Melt Flow | D1238 (230° C./3.8 kg) | 17.60 | g/10 min. |
| Tensile Strength | D638 (Type 1 - Rigids, Break, 0.2 in/min.) | 54.3 | MPa |

TABLE 1-continued

Physical Properties

| Test | ASTM No. | Value | Units |
| --- | --- | --- | --- |
| Tensile Elongation at Break | D638 (Type 1 - Rigids, 0.2 in/min.) | 2.0 | % |
| Tensile Modulus | D638 (Type 1 - Rigids, 0.2 in/min.) | 4,199 | MPa |
| Flexural Modulus | D790 | 3,985 | MPa |
| Izod | D256 (Notched - Method A, Injection Molded, 0.250 in bars 23° C.) | 11 | J/m |
| Unnotched Izod | D4812 (Injection Molded, 0.125 in bars, 23° C.) | 139 | J/m |
| Heat Deflection Temperature | D648 (Unannealed, 264 psi, 0.250 in bars) | 71 | ° C. |
| Heat Deflection Temperature | D648 (Unannealed, 66 psi, 0.250 in bars) | 82 | ° C. |
| Haze Range | D1003 | 71-85 | % |
| Light Transmittance | D1003 | 35-40 | % |
| Mold Shrinkage Range | D955 | 0.0027-0.0029 | cm/cm |

The technical literature for the acrylic resin (http://www.plexiglas.coi/altuglas/technicalinfo/resins/pdfs/english/VS.pdf) reports a haze of less than 2% and a light transmittance of 92%, when tested using ASTM D1003. Thus, the treated silica particulate resulted in a decrease in light transmittance of no more than 23% but an increase in haze of as much as 20-fold.

The invention is not limited to the above embodiments. The claims follow.

What is claimed is:

1. A compound comprising, (a) a substantially transparent resin, wherein the substantially transparent resin is selected from the group consisting of extrusion grade acrylic resin and polycarbonate resin and (b) amorphous silica particulate having a nanometric size dispersed in the resin, wherein the haze range of the compound is about 71% to about 85%.

2. The compound of claim 1, wherein the substantially transparent resin is optical grade.

3. The compound of claim 1, wherein the silica particulate has a particle size ranging from about 20 nm to 550 nm.

4. The compound of claim 3, wherein the silica particulate has a mean particle size of about 250 nm.

5. The compound of claim 1, wherein the silica particulate has a B.E.T. surface area of from about 20 to 30 $m^2$/gram.

6. The compound of claim 1, wherein the silica particulate is surface treated with a silane composition.

7. The compound of claim 6, wherein the silane composition is an aliphatic silane having from about 8 to about 18 carbon atoms.

8. The compound of claim 7, wherein the silane composition is selected from the group consisting of n-octyltrimethoxysilane and quaternary ammonium functional alkoxysilane.

9. The compound of claim 1, wherein the amount of silica particulate ranges from about 2 to about 25 weight percent of the compound.

10. The compound of claim 1, wherein the amount of silica particulate ranges from about 40 to about 80 weight percent of the compound.

11. The compound of claim 1, further comprising one or more optional additives selected from the group consisting of adhesion promoters; biocides, anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

12. An article to diffuse and transmit light from a point source of light comprising a cylinder made from a compound comprising (a) a substantially transparent resin selected from the group consisting of extrusion grade acrylic resin and polycarbonate resin and (b) amorphous silica particulate having a nanometric size dispersed in the resin, wherein the haze range of the compound is about 71% to about 85%, wherein the cylinder has a circumference and a length and two ends, and wherein the cylinder is a light pipe that diffuses light from the circumference substantially evenly along the length of the cylinder from a point source of light contacting one or both ends of the cylinder.

13. The article of claim 12, wherein the substantially transparent resin is extrusion grade acrylic resin and wherein the article has a light transmittance of about 35-40 percent.

14. The article of claim 13, wherein the article has a decrease in light transmittance of less than 50% but a multi-fold increase in haze, when compared with extrusion grade acrylic resin without silica particulate dispersed therein.

* * * * *